(12) United States Patent
Polón

(10) Patent No.: US 6,338,423 B1
(45) Date of Patent: Jan. 15, 2002

(54) DEVICE FOR FEEDING MATERIAL

(75) Inventor: Juhani Polón, Helsinki (FI)

(73) Assignee: Privet Oy, Helsinki (FI)

( * ) Notice: Subject to any disclaimer, the term of this patent is extended or adjusted under 35 U.S.C. 154(b) by 0 days.

(21) Appl. No.: 09/581,442

(22) PCT Filed: Dec. 23, 1998

(86) PCT No.: PCT/FI98/01017

§ 371 Date: Jun. 13, 2000

§ 102(e) Date: Jun. 13, 2000

(87) PCT Pub. No.: WO99/33727

PCT Pub. Date: Jul. 8, 1999

(30) Foreign Application Priority Data

Dec. 29, 1997 (FI) ................................................ 974634

(51) Int. Cl.⁷ ................................................ G01F 11/10
(52) U.S. Cl. ...................... 222/368; 222/148; 222/363; 222/636
(58) Field of Search ................................ 222/368, 363, 222/148, 636

(56) References Cited

U.S. PATENT DOCUMENTS

| | | | |
|---|---|---|---|
| 3,077,272 A | | 2/1963 | Reinhall |
| 3,283,956 A | * | 11/1966 | Craswell ........................ 222/1 |
| 3,353,723 A | | 11/1967 | Wieleba |
| 4,009,788 A | * | 3/1977 | Waldhofer .................... 214/17 |
| 4,058,240 A | | 11/1977 | Becker |
| 4,383,545 A | * | 5/1983 | Becker ........................ 137/204 |
| 4,494,561 A | * | 1/1985 | Ogasawara .................. 137/204 |
| 4,765,592 A | * | 8/1988 | Minai .......................... 251/368 |
| 5,823,401 A | * | 10/1998 | Zgoda .......................... 222/333 |

FOREIGN PATENT DOCUMENTS

| | | |
|---|---|---|
| DE | 2527412 | 1/1977 |
| DE | 3313025 | 10/1984 |
| EP | 0214844 | 3/1987 |
| WO | 9306032 | 4/1993 |

* cited by examiner

Primary Examiner—Kevin Shaver
Assistant Examiner—M A Cartagena
(74) Attorney, Agent, or Firm—Rosenman & Colin LLP

(57) ABSTRACT

Device for feeding material from a pressurised space to a space at a lower pressure, said device comprising a frame (2) with an admission port (5) and a discharge port (6), and a feed element (1) rotatably mounted inside the frame, said feed element containing at least one chamber space (3, 4) opening at the surface of the feed element, as well as means (7, 8) for turning the feed element between at least one first position, in which the chamber space (3, 4) communicates with the admission port (5), and at least one second position, in which the chamber space communicates with the discharge port (6), as well as at least one sealing element (9, 10) fitted against the surface of the feed element. The device is provided with a passage from the side of the admission port (5) to the side of the discharge port (6), said passage being open in at least one position of the feed element (1).

26 Claims, 4 Drawing Sheets

DEVICE FOR FEEDING MATERIAL

Figure 1:
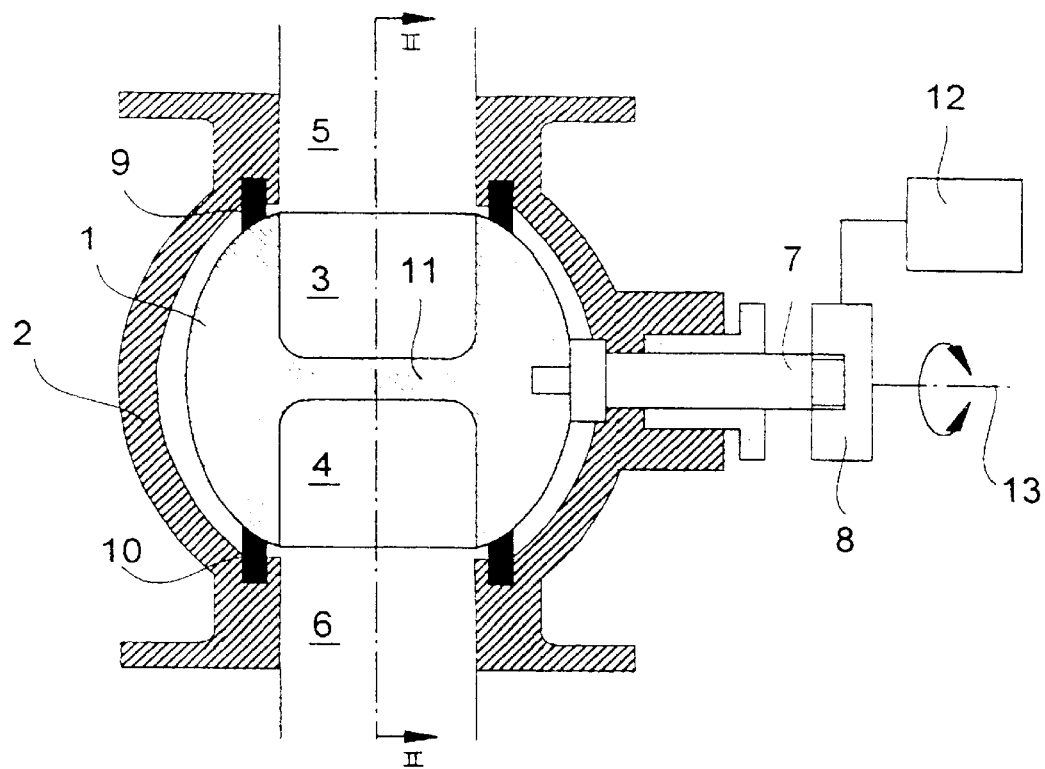

The present invention relates to a device as defined in the preamble of claim 1. The invention also relates to use of the device according to claim 14 or 15.

In mass treatment, e.g. in conjunction with the so-called rubbish traps of sand separators, knot scrubbers and screens, various valve solutions have been used. The solution used e.g. in conjunction with centrifugal cleaners comprises a container placed at the lower end of the centrifugal cleaner and provided with a first valve in its upper part and a second valve in its lower part. The rubbish trap system functions as follows. When the upper valve is opened, any impurities heavier than the mass being processed descend into the container, which is closed by the lower valve. When the container has been filled to a sufficient level, the upper valve is closed, and after it has been closed up, the lower valve is opened, whereupon the material in the container descends into the space located after the lower valve, e.g. into a piping system. After this, the lower valve is closed and air is removed from the space between the valves. The upper valve can now be opened and the above-described cycle of operation repeated. The rubbish trap system is usually controlled by using a control means such as a logic system or computer, e.g. a process computer. Prior-art rubbish trap systems have the drawback that both valves may be left open due to a malfunction, in which case the mass can flow through the rubbish trap system at full process pressure.

There are also blocking feeders which have a rotor rotating about its axis and divided by partitions into adjacent compartments which are filled and evacuated one after the other. The disadvantages of prior-art blocking feeders include a complex structure and e.g. sealing problems due to uneven wear. One of the drawbacks of prior-art solutions is that they may admit gases into the process, for instance air when an empty blocking feeder is returning to the filling position.

The object of the present invention is to achieve a solution in which material can be removed from a higher pressure into a lower pressure without the drawbacks of prior art. Another object of the invention is to achieve a completely new type of solution for implementing a so-called rubbish trap for various cleaner devices, screens, sorters and equivalent.

The invention is characterised by what is presented in the claims.

The apparatus of the invention has numerous significant advantages. The apparatus comprises a passage for a so-called by-pass flow to prevent gases potentially harmful to the process from getting into the process from the lower pressure. By-pass flow promotes the emptying of the chamber space of a feed element e.g. by forcing the rubbish towards the discharge port. The device provides a very high degree of reliability in operation. It can be easily connected to control systems. Periodic operation in opposite directions results in uniform wear of the sealing elements. Moreover, in rubbish trap use, the device is reliable and permits no flow through it in the event of malfunction As compared with known rubbish trap systems, the apparatus makes it possible to replace an aggregate of several devices with a single device. The sealing elements of the device are replaceable. In addition, the solution allows the apparatus to be used in widely different conditions, among other things in consequence of the materials used in the sealing elements.

Figure 2:
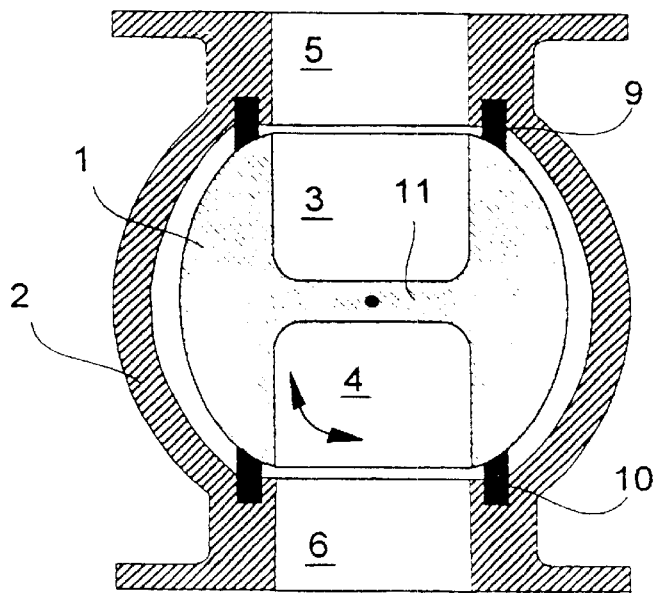
Figure 3:
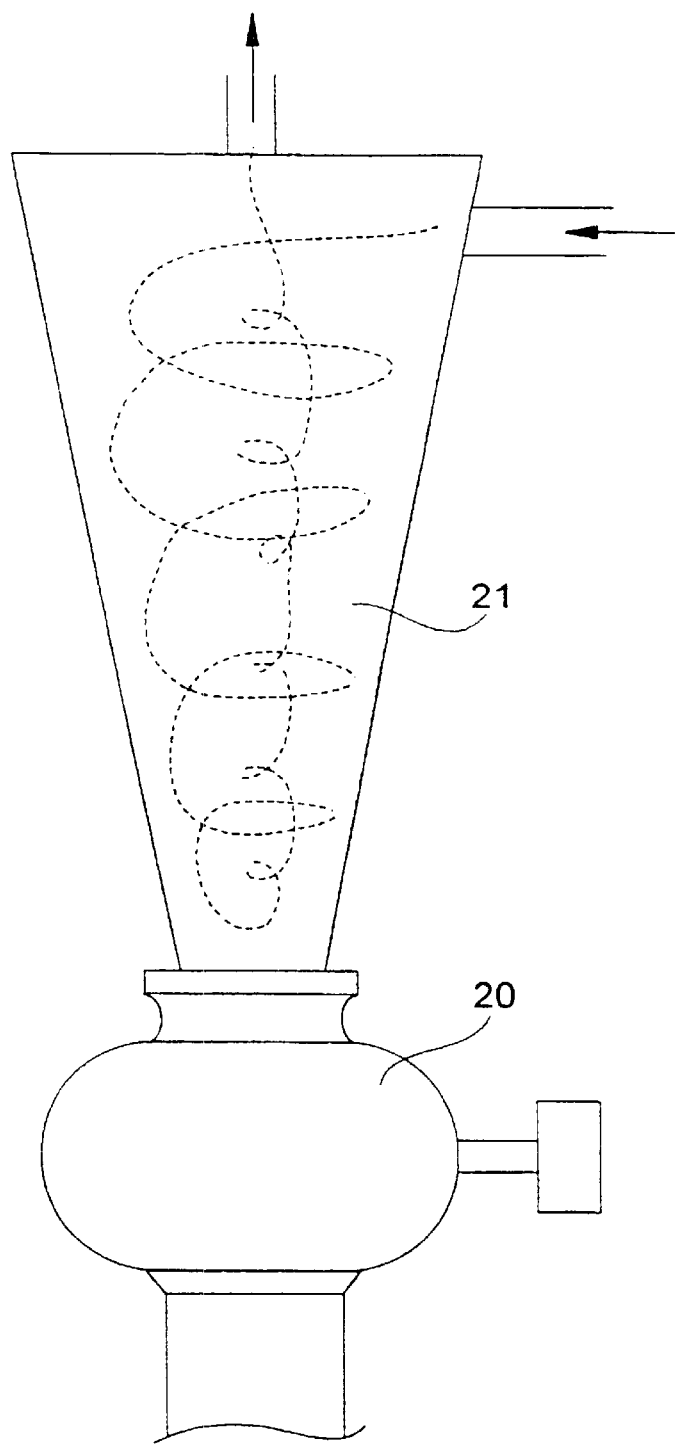
Figure 4:
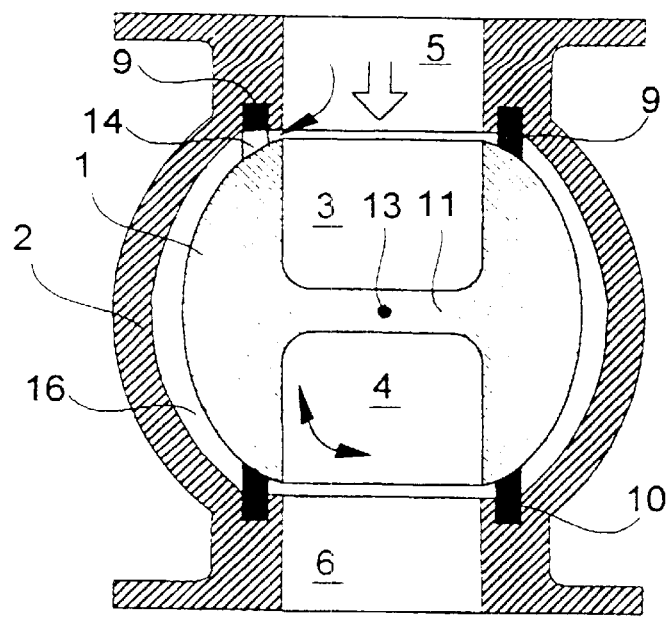
Figure 5:
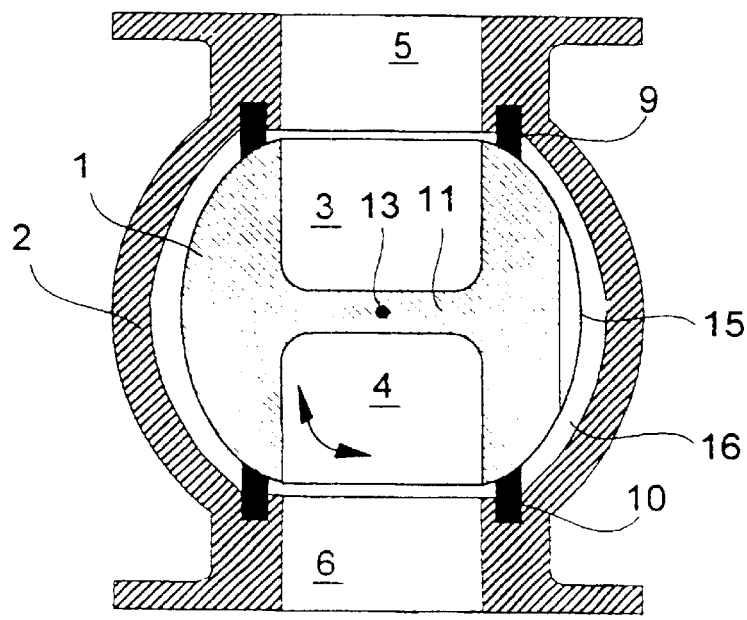
Figure 6:
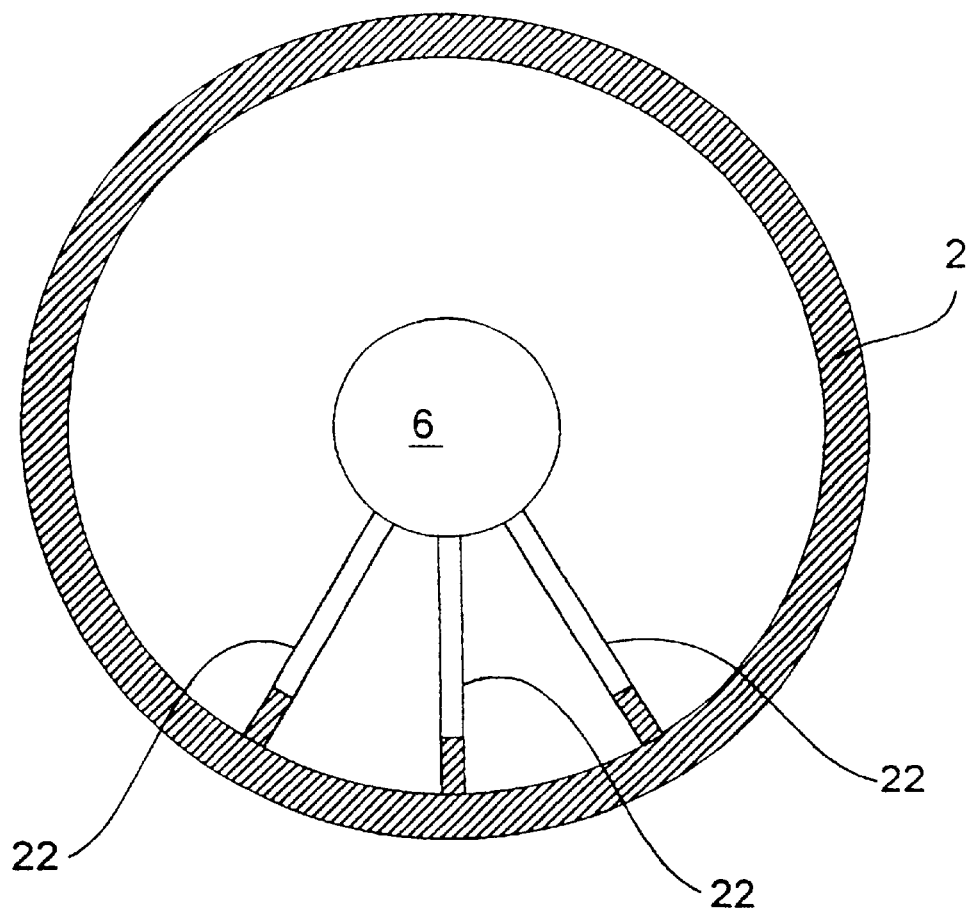

In the following, the invention will be described in detail by the aid of an example by referring to the attached drawings, wherein FIG. 1 presents a device according to the invention in sectioned side view, FIG. 2 presents the device of the invention, sectioned along line II—II in FIG. 1, FIG. 3 presents the device of the invention used in conjunction with a centrifugal cleaner, FIG. 4 presents another embodiment of the device of the invention, corresponding to FIG. 3, FIG. 5 presents another embodiment of the device of the invention, corresponding to FIG. 3, and FIG. 6 represents a housing provided with guide elements (without feed element).

The device of the invention comprises a frame or housing 2 which is provided with an admission port 5 and a discharge port 6. Rotatably mounted inside the housing is a feed element 1. The feed element 1 comprises at least one chamber space 3, 4, which opens at the surface of the feed element. The feed element 1 can be turned within the housing 2 so that in at least one position the chamber space 3, 4 communicates with the admission port 5 of the housing, permitting the material which is to be discharged to enter from the admission port into the chamber space 3, 4, and in at least one other position the chamber space 3, 4 communicates with the discharge port 6 of the housing, through which the material to be discharged is removed from the chamber space.

In the solution illustrated by FIGS. 1 and 2, the feed element 1 comprises two chambers 3, 4 opening at the surface of the feed element, on opposite sides of the feed element. The chambers are separated from each other by a wall 11. In the case illustrated by the figures, the wall constitutes the bottom of the chambers.

The feed element 1 is rotationally symmetrical with respect to the axis 13 of rotation. In the solution illustrated by the figures, the feed element is of a spherical shape, but it could also be e.g. of a cylindrical or slightly conical structure.

The means for turning the feed element comprise a shaft 7 connected to the feed element and extending through the wall of the housing 2 and an actuator 8 for turning the shaft 7 between a first position and a second position. The turning movement is preferably a periodic back-and-forth movement. The range of the movement depends on the number of chambers 3, 4 in the feed element 1. In the case illustrated by the figure, in which the feed element comprises two chambers disposed oppositely to each other, the turning movement is preferably substantially 180°.

Moreover, the device comprises sealing elements 9, 10 fitted against the surface of the feed element 1. In the solution illustrated by FIGS. 1 and 2, the device comprises first sealing elements and second sealing elements. The first sealing elements 9 are preferably disposed around the admission port 5 of the housing 2. The second sealing elements 10 are preferably disposed around the discharge port 6 of the housing. The sealing elements are of a hoop-like design, in the example illustrated substantially ring-like. Different types of sealing element can be used in the device, depending on application. The sealing elements may be made of different materials, including synthetic materials, such as PTFE, or metals, e.g stellite. Thanks to its structure and the materials used in it, the device is applicable for use in conjunction with widely different materials, including corrosive materials. The sealing solutions also permit the device to be used in a very large range of temperatures, −200° C.−+800° C.

As a result of the symmetric operation (back-and-forth movement) of the device, wear is uniform. The placement and structure of the sealing elements allow them to be replaced. The housing 2 can be implemented as an openable structure so that the sealing elements and feed element can be easily serviced or replaced if necessary.

FIG. 4 presents another preferred embodiment of the apparatus. It comprises a housing 2 and a feed element 1 disposed inside the housing. In this embodiment, at least one passage has been provided from a piping system above the apparatus into a piping system below it, at least in one position of the feed element 1. In the case illustrated by the figure, the passage has been arranged to run between the feed element 1 and the housing 2. The passage can be formed e.g. by making at least one aperture or gap 14 in the sealing element 9. The aperture 14 may be made in sealing the element 9 at the edge facing the feed element 1, so that it leads through the sealing and opens on the side adjacent the feed element 1, or at the edge facing the housing 2 so that the aperture leads through the sealing and opens on the side adjacent the housing and/or so that the aperture merely leads through the sealing 9. The passage can also be achieved by forming at least one connection to the housing 2 from the side of the admission port 5 into the space inside the housing containing the feed element 1.

FIG. 5 presents another preferred structural alternative, in which the feed element 1 is provided with at least one bevelling 15 or groove. In this case, when the groove or bevelling 15 is in the area of the sealing 9, a passage is created between the sealing and the feed element 1. By appropriately disposing the grooves and/or bevellings, it is possible to regulate e.g. the duration of by-pass flow during a working cycle and the number of spurts of by-pass flow. Correspondingly, the feed element 1 can be provided with a hole/connection that allows by-pass flow through it when the first end of the hole is in the area of the admission port 5 and the second end opens into the space between the housing 2 and the feed element 1.

The passage can be equipped with means for directing the by-pass flow, e.g. so that the by-pass flow is directed towards a desired point in the discharge port. The means for directing the by-pass flow typically comprise guide elements 22. The guide elements may be e.g. grooves and/or ridges provided on the interior surface of the housing 2 and arranged in desired directions. In the embodiment in FIG. 6, in which the housing has been sectioned along a horizontal plane, the interior surface of the housing is provided with ridges 22 formed e.g. by welding. The ridges direct the by-pass flow in the space formed between them towards the discharge port 6.

The device works as follows:

Material to be treated, such as impurities, enters into a piping system (not shown) above the device and descends through the admission port 5 into chamber space 3 of the feed element, which is now in a first position. After the chamber space has been filled to a sufficient level, the feed element 1 is turned in the housing 2 into a second position, whereupon chamber 3 is emptied via the discharge port 6. In the solution presented in the figure, the feed element comprises two symmetric chamber spaces 3, 4. When the chamber space 3 opposite to the admission port 5 is being filled, the chamber space 4 opposite to the discharge port 6 is being emptied.

The actuator 8 of the feed element has been arranged to rotate the feed element preferably substantially through 180°, alternately in opposite directions. The change of direction allows more uniform wear of the device, thus prolonging its useful life. The actuator is preferably controlled by a controller 12, which may be an independent unit or included as a part in the process control system. The actuator may be provided e.g. with a magnetic valve which, upon receiving a control signal from the control logic, causes the actuator to turn the feed element.

The apparatus presented in FIG. 4 and 5 allow so-called by-pass flow by providing a passage from the side of the admission port 5 via the space between the housing 2 and the feed element 1 to the side of the discharge port 6 at least in one position of the feed element 1. In the embodiment illustrated by FIG. 4, the material to be treated is supplied e.g. through a radial groove 14 formed in the sealing 9 into the space 16 between the housing and the feed to element 1. When the feed element is turned from the position shown in FIG. 4 so that the empty chamber space 4 communicates with the space between the housing and the feed element and simultaneously a by-pass flow of the material being treated is admitted from the side facing the admission port 5 to the side facing the discharge port and into the discharge port 6. The by-pass flow or flushing flow flushes any impurities downward and fills the empty chamber space 4 so that no air can flow upstream. When the feed element 4 is turned further so that chamber space 4 no longer communicates with the discharge port 6, the by-pass flow ceases. The apparatus functions in a corresponding manner when chamber space 3 has been brought into the emptying position.

In the embodiment in FIG. 5, the feed element 1 is provided with a groove 15, bevelling or the like, so that when the groove is in the area of the sealing 9, a passage is opened between the groove 15 and the sealing 9 from the side facing the admission port 5 to the side facing discharge port 6 at least in one position of the feed element. By varying the location and shape of the groove, it is possible to influence the duration and volume of the so-called by-pass flow.

The volume of by-pass flow can also be varied e.g. by adjusting the turning speed of the feed element and by altering the clearance between the feed element and the housing/sealing.

The device of the invention can be manufactured e.g. from a valve known in itself, such as a ball valve, having a housing and a closing element with a passage in the closing element (ball) for a flowing medium. In this case it is possible to provide the closing element, e.g. by welding, with a wall blocking the passage, forming in the closing element at least one chamber, preferably two chambers opening at the surface of the closing element.

The device of the invention is applicable, among other things, for the removal of impurities from various processes. e.g. in conjunction with cleaning apparatus, sorters, screens and equivalent for the removal of rejects. This means using the device as a so-called rubbish trap. In FIG. 3, the device of the invention has been connected to a cleaning apparatus, such as a centrifugal cleaner 21, in which case it is used for the removal of the reject separated in the centrifugal cleaner. The operation of the centrifugal cleaner will not be described in detail in this context, but it is assumed to be obvious to the person skilled in the art. The device can also be used e.g. for taking samples from various processes.

It is obvious to a person skilled in the art that different embodiments of the invention are not restricted to the examples presented above, but that they may be varied within the scope of the claims presented below.

What is claimed is:

1. Device for feeding material from a pressurized space to a space at a lower pressure, said device comprising:
  a frame with an admission port and a discharge port,
  a feed element rotatably mounted inside the frame, said feed element having a surface, said feed element containing at least one chamber space opening at the surface of the feed element, means for turning the feed element between at least one first position in which the chamber space communicates with the admission port and at least one second position in which the chamber space communicates with the discharge port, at least one sealing element fitted against the surface of the feed element, wherein the device is provided with a passage from the side of the admission port to the side of the discharge port, said passage being open in at least one position of the feed element, and wherein said passage comprises at least one aperture formed in the sealing element.

2. Device as defined in claim 1, wherein the passage is open at least during part of a second position in which the chamber space communicates with the discharge port.

3. Device as defined in claim 1, wherein the passage further comprises the space between the feed element and the frame.

4. Device as defined in claim 1, wherein the feed element is a rotationally symmetrical body.

5. Device as defined in claim 1, wherein the feed element is provided with two chamber spaces.

6. Device as defined in claim 1, wherein the sealing element is disposed in the vicinity of the admission port or the discharge port or both.

7. Device as defined in claim 1, wherein the sealing element is made of a synthetic material or metal.

8. Device as defined in claim 1, wherein the feed element comprises two chamber spaces opening in opposite directions and separated by a wall.

9. Device as defined in claim 1, wherein the turning means is fitted to turn the feed element alternately in opposite directions between said at least one first position and said at least one second position.

10. Device as defined in claim 1, wherein the discharge port opens in a substantially downward direction.

11. Device as defined in claim 1, wherein the passage comprises means for directing a by-pass flow.

12. A method of using the device of claim 1, wherein said method comprises using said device as a sampling device.

13. A method of using the device of claim 1, wherein said method comprises the use of the device in conjunction with process cleaning apparatus, sorters and screens for the removal of rejects.

14. Device for feeding material from a pressurized space to a space at a lower pressure, said device comprising:

a frame with an admission port and a discharge port, a feed element rotatably mounted inside the frame, said feed element having a surface, said feed element containing at least one chamber space opening at the surface of the feed element, means for turning the feed element between at least one first position in which the chamber space communicates with the admission port and at least one second position in which the chamber space communicates with the discharge port, least one sealing element fitted against the surface of the feed element, wherein the device is provided with a passage from the side of the admission port to the side of the discharge port, said passage being open in at least one position of the feed element, and wherein said passage comprises at least one groove formed in the surface of the feed element.

15. Device as defined in claim 14, wherein the passage is open at least during part of a second position in which the chamber space communicates with the discharge port.

16. Device as defined in claim 14, wherein the feed element is a rotationally symmetrical body.

17. Device as defined in claim 14, wherein the feed element is provided with two chamber spaces.

18. Device as defined in claim 14, wherein the sealing element is disposed in the vicinity of the admission port or the discharge port or both.

19. Device as defined in claim 14, wherein the scaling element is made of a synthetic material or metal.

20. Device as defined in claim 14, wherein the feed element comprises two chamber spaces opening in opposite directions and separated by a wall.

21. Device as defined in claim 14, wherein the turning means is fitted to turn the feed element alternately in opposite directions between said at least one first position and said at least one second position.

22. Device as defined in claim 14, wherein the discharge port opens in a substantially downward direction.

23. Device as defined in claim 14, wherein the passage comprises means for directing a by-pass flow.

24. Device as defined in claim 14, wherein the passage comprises the space between the feed element and the frame.

25. A method of using the device of claim 14, wherein said method comprises using said device as a sampling device.

26. A method of using the device of claim 14, wherein said method comprises the use of the device in conjunction with process cleaning apparatus, sorters and screens for the removal of rejects.

\* \* \* \* \*